(12) United States Patent
Johns

(10) Patent No.: US 10,194,669 B2
(45) Date of Patent: Feb. 5, 2019

(54) PROTEIN-RICH FOOD PRODUCT AND METHOD OF MAKING A PROTEIN-RICH FOOD PRODUCT

(71) Applicant: Rose Acre Farms, Inc., Seymour, IN (US)

(72) Inventor: Peggy D. Johns, Monon, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 0 days.

(21) Appl. No.: 15/833,653

(22) Filed: Dec. 6, 2017

(65) Prior Publication Data

US 2018/0125079 A1 May 10, 2018

Related U.S. Application Data

(63) Continuation of application No. PCT/US2017/060022, filed on Nov. 3, 2017.
(Continued)

(51) Int. Cl.
| | |
|---|---|
| *A21D 13/42* | (2017.01) |
| *A23L 15/00* | (2016.01) |
| *A23L 7/109* | (2016.01) |
| *A23L 29/269* | (2016.01) |
| *A23P 30/40* | (2016.01) |
| *A23L 29/238* | (2016.01) |
| *A23J 3/00* | (2006.01) |
| *A21D 13/04* | (2017.01) |
| *A21D 13/064* | (2017.01) |
| *A21D 13/066* | (2017.01) |

(52) U.S. Cl.
CPC .............. *A21D 13/42* (2017.01); *A21D 13/04* (2013.01); *A21D 13/064* (2013.01); *A21D 13/066* (2013.01); *A23J 3/00* (2013.01); *A23L 7/109* (2016.08); *A23L 15/20* (2016.08); *A23L 29/238* (2016.08); *A23L 29/27* (2016.08); *A23P 30/40* (2016.08); *A23V 2002/00* (2013.01)

(58) Field of Classification Search
CPC .. A23L 15/20; A23J 1/08; A21D 13/42; A23P 30/40
USPC ........................................................ 426/657
See application file for complete search history.

(56) References Cited

U.S. PATENT DOCUMENTS

| | | |
|---|---|---|
| 2,236,006 A | 3/1941 | Mulvany |
| 3,062,665 A | 11/1962 | Peebles et al. |
| (Continued) | | |

FOREIGN PATENT DOCUMENTS

| | | |
|---|---|---|
| CN | 103005505 A | 4/2013 |
| EP | 2926674 | 10/2015 |
| (Continued) | | |

OTHER PUBLICATIONS

Veggie and Egg White Breakfast Wrap, Paleoso, (2016), available on the Internet at https://paleoso.com/veggie-egg-white-breakfast-wrap/; 2 pages.

(Continued)

*Primary Examiner* — Jeffrey P Mornhinweg
(74) *Attorney, Agent, or Firm* — Faegre Baker Daniels LLP

(57) ABSTRACT

A protein-rich food product comprising water and solids, wherein at least 70% of the solids consist of protein, and a method for making the protein-rich food product. The protein-rich food product is capable of replacing flour food products as a low-calorie, gluten-free, high-protein alternative.

11 Claims, 20 Drawing Sheets

Related U.S. Application Data

(60) Provisional application No. 62/554,597, filed on Sep. 6, 2017, provisional application No. 62/470,709, filed on Mar. 13, 2017, provisional application No. 62/417,679, filed on Nov. 4, 2016.

(56) References Cited

U.S. PATENT DOCUMENTS

| | | | |
|---|---|---|---|
| 3,679,338 A | 7/1972 | Lutz | |
| 3,711,299 A | 1/1973 | Ziegler | |
| 3,843,811 A | 10/1974 | Seeley | |
| 3,930,054 A | 12/1975 | Liot et al. | |
| 4,138,507 A | 2/1979 | Iimura | |
| 4,421,770 A * | 12/1983 | Wiker | A23J 3/04 426/103 |
| 4,866,937 A | 9/1989 | Leigh-Monstevens | |
| 4,957,760 A | 9/1990 | Swartzel et al. | |
| 5,296,247 A | 3/1994 | Huang et al. | |
| 5,932,276 A | 8/1999 | Bhatia et al. | |
| 5,935,628 A | 8/1999 | Hauser et al. | |
| 5,989,620 A | 11/1999 | Wang et al. | |
| 6,004,603 A | 12/1999 | Vandepopuliere et al. | |
| 6,764,705 B2 | 7/2004 | Shefet | |
| 8,080,276 B2 | 12/2011 | Dybing | |
| 8,273,394 B2 | 9/2012 | Watanabe et al. | |
| 8,561,528 B2 | 10/2013 | Peters | |
| 8,746,132 B2 | 6/2014 | Lawrence et al. | |
| 2001/0009686 A1 | 7/2001 | Merkle et al. | |
| 2003/0134023 A1 | 7/2003 | Anfinsen | |
| 2003/0134030 A1 | 7/2003 | Merkle et al. | |
| 2005/0013917 A1 | 1/2005 | O'Kelley et al. | |
| 2007/0275127 A1 | 11/2007 | Ball et al. | |
| 2008/0085359 A1 | 4/2008 | Merkle et al. | |
| 2008/0254168 A1 | 10/2008 | Mueller et al. | |
| 2008/0292769 A1 | 11/2008 | Tang et al. | |
| 2014/0271998 A1 | 9/2014 | Hecht | |
| 2015/0017295 A1 | 1/2015 | Kuil et al. | |
| 2015/0079247 A1 | 3/2015 | Merkle et al. | |
| 2016/0165943 A1 | 6/2016 | Yurgec et al. | |

FOREIGN PATENT DOCUMENTS

| | | |
|---|---|---|
| JP | 2016002000 A | 1/2016 |
| WO | 2008073849 A2 | 6/2008 |
| WO | 2014118265 A1 | 8/2014 |
| WO | 2016077457 | 5/2016 |

OTHER PUBLICATIONS

"Egg White Power (spray-dried egg white)", MolecularRecipes.com, (2016), available on the Internet at http://www.molecularrecipes.com/hydrocolloid-guide/egg-white-powder/; 4 pgs.

International Search Report and Written Opinion issued by the ISA/US, Commissioner for Patents, dated Feb. 1, 2018, for International Application No. PCT/US2017/060022; 11 pages.

* cited by examiner

PROTEIN-RICH FOOD PRODUCT AND METHOD OF MAKING A PROTEIN-RICH FOOD PRODUCT

CROSS-REFERENCE TO RELATED APPLICATIONS

This application is a continuation of international patent application no. PCT/US2017/060022, filed on Nov. 3, 2017, which claims the benefit of U.S. Patent Applications Ser. Nos. 62/554,597, filed Sep. 6, 2017, 62/470,709, filed Mar. 13, 2017, and 62/417,679, filed Nov. 4, 2016, said applications are incorporated herein by reference in their entirety.

TECHNICAL FIELD

The present disclosure relates generally to protein-rich food products and, more particularly, to protein-rich food products intended to substitute flour food products.

BACKGROUND OF THE DISCLOSURE

Obesity and diabetes are chronic diseases. Treatment and prevention of obesity and diabetes include healthy eating and active living. Healthy eating includes reducing calorie intake. Processed flour food products increase carbohydrate intake and are inexpensive. One strategy to increase healthy eating is to reduce consumption of flour food products. However, many alternatives to flour food products are expensive for many people to consume on a daily basis and many do not taste or have the characteristics that people find appealing in flour food products.

A need exists for food alternatives that are healthy, gluten-free, low-carb, and/or low-calorie. Accordingly, it would be beneficial to offer protein food products as alternatives to flour food products.

SUMMARY OF CLAIMED EMBODIMENTS

The present disclosure provides food products comprising high protein content and intended to substitute flour food products such as tortilla, pizza crust, pasta, and other flour food products. The present disclosure also provides a process for manufacturing the protein-rich food products.

In one embodiment, a method of making a protein-rich food product comprises providing protein and water to form a protein mixture; aerating the protein mixture to make a whip having a smaller density than the protein mixture; forming the whip into a mass having a first thickness; and heating the mass at least until the first thickness collapses to a second thickness smaller than the first thickness.

In some embodiments, a protein-rich food product is manufactured according to a method comprising: providing protein and water to form a protein mixture; aerating the protein mixture to make a whip having a smaller density than the protein mixture; forming the whip into a mass having a first thickness; and heating the mass at least until the first thickness collapses to a second thickness smaller than the first thickness.

In some embodiments, a protein-rich food product is made by: providing protein and water to form a protein mixture, wherein solids in the protein mixture comprise more than 10% and less than 27% by weight of the protein mixture, and wherein at least 70% of the solids consist of protein; whipping the protein mixture for a period of time sufficient to form a whip having a density of 0.20 grams/cm3 or less; forming the whip into a mass having a first thickness; and heating the mass at least until the first thickness decreases to a second thickness smaller than the first thickness, wherein a ratio of the first thickness to the second thickness is at least 2.

In some embodiments, a protein-rich food product comprises water and solids, wherein at least 70% of the solids consist of albumen or consist of albumen and a protein selected from the group consisting of weigh, soy, and hemp.

In some embodiments, a protein-rich food product comprises water and solids, wherein at least 70% of the solids consist of protein, wherein the protein-rich food product has a moisture content of between 65% and 78% by weight, and wherein the protein-rich food product is substantially flat and has a thickness less than or equal to 3 millimeters, a tensile strength between 60 and 760 grams, and a burst strength between 50 and 450 grams.

In some embodiments, a protein-rich food product comprises water and protein, wherein the water and the protein form a protein mixture, and wherein solids in the protein mixture comprise more than 10% and less than 27% by weight of the protein mixture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
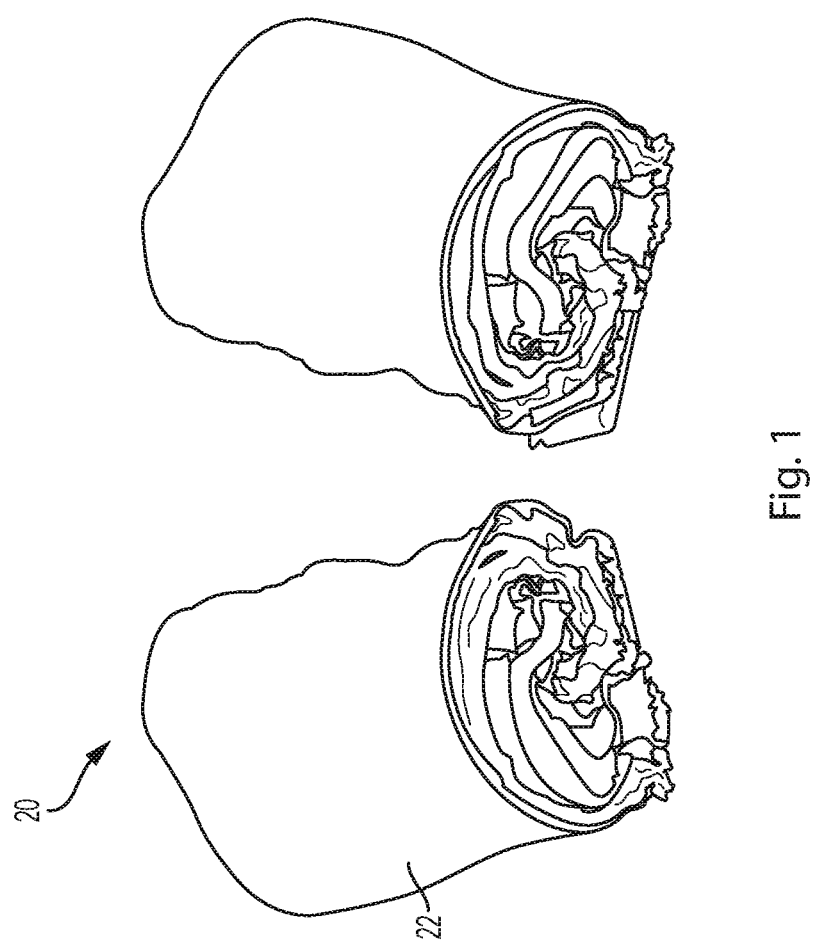
FIG. 1 shows a perspective view of a wrap made with a protein-rich tortilla made in accordance with embodiments of the present disclosure.

For the purposes of promoting an understanding of the principles of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings.

Flour-similar protein food products, also referred to herein as protein-rich food products, may consist substantially of protein and water. The protein may be albumen, whey, soy, or other protein. The protein-rich food product may include binders, stabilizers, and additives (defined below). A method of making the protein-rich food product comprises providing protein and water to form a protein mixture, whipping the protein mixture to form a whip or batter, and heating the whip until it collapses. Advantageously, protein-rich food products made as described herein have texture, color, odor, and structural functionality similar to equivalent flour food products and, accordingly, may be used as direct substitutes for flour food products.

Figure 19:
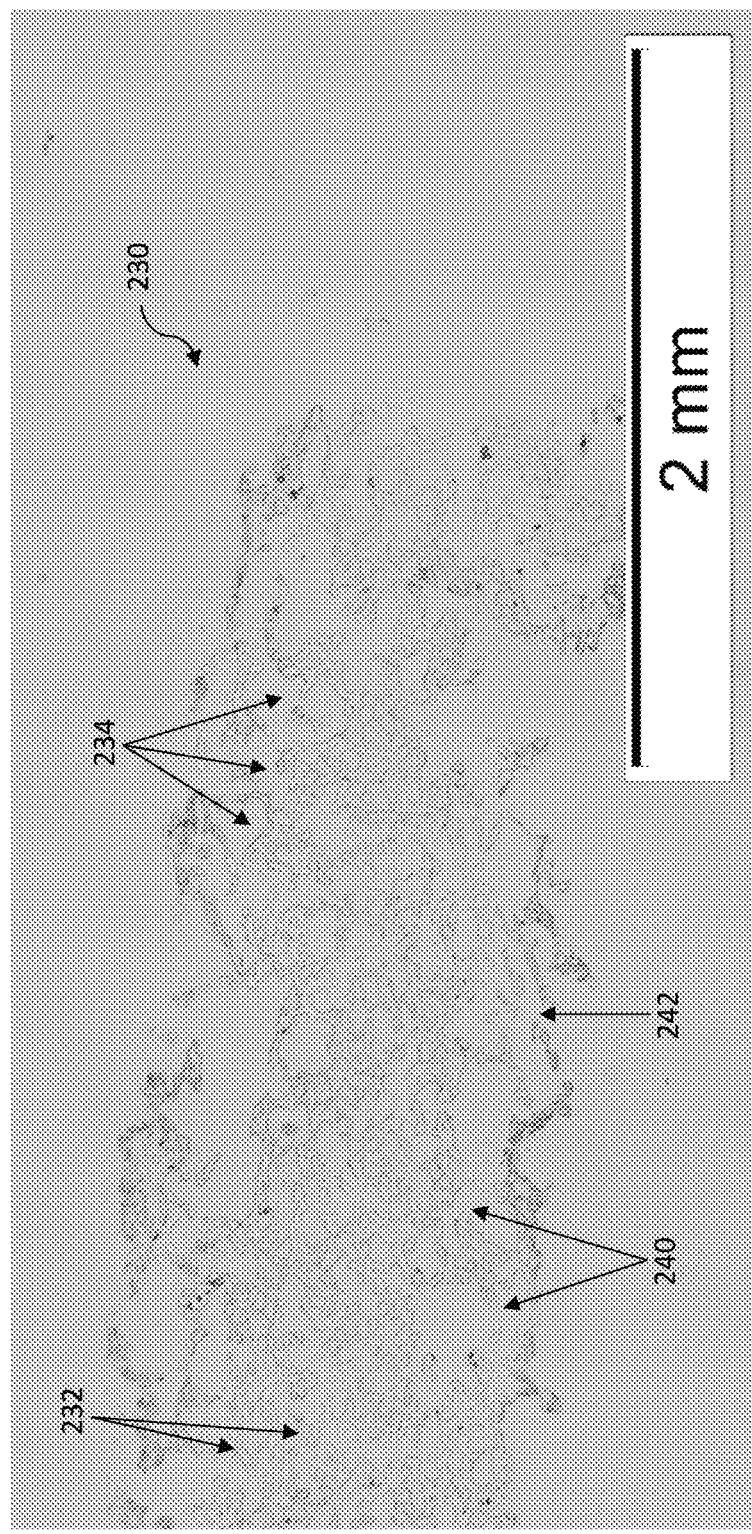
FIG. 19 is microscopic cross-sectional view of a protein-rich tortilla made in accordance with embodiments of the present disclosure.
Figure 20:
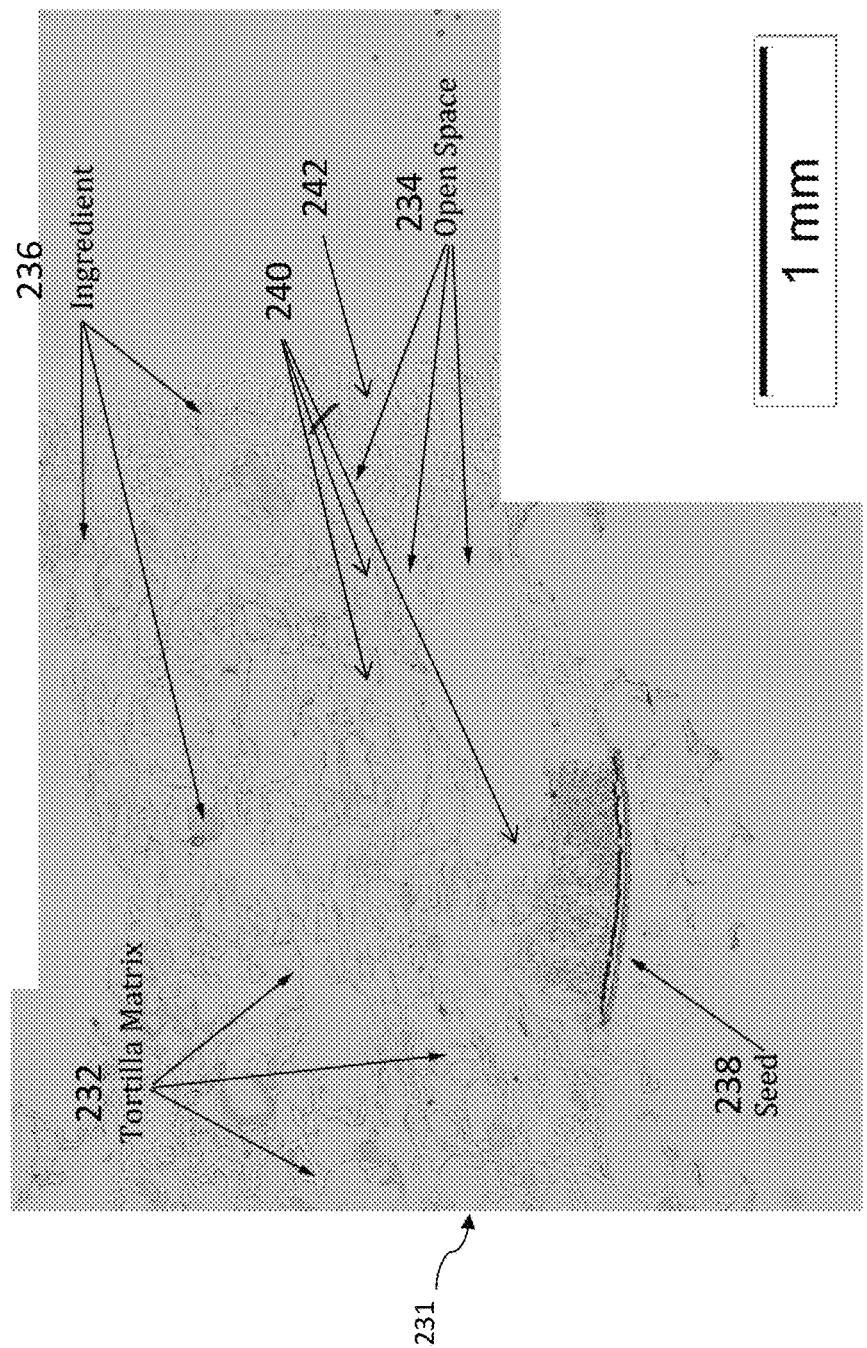
FIG. 20 is microscopic cross-sectional view of a savory protein-rich tortilla made in accordance with embodiments of the present disclosure.

Without being bound by theory, it is believed that whipping a protein mixture with the appropriate water and protein content creates bubbles in the whipped mixture. The size of the bubbles may be determined by the characteristics and amount of protein. Heating the whip causes air expansion in the bubbles which burst creating paths through the whip and causing the whip to collapse due to the release of air and steam. A microscopic cross-sectional view of a protein-rich tortilla 230 and a savory protein-rich tortilla 231 are shown in FIGS. 19 and 20, respectively, showing a tortilla matrix 232, open spaces or bubbles 234, ingredients 236 (FIG. 20), seeds 238 (FIG. 20), burst membranes 240, and air escape path 242 created by a plurality of burst membranes 240. The ingredients and additives of corresponding protein-rich tortillas are described with reference to Tables 1 and 2 below. The steam and hot air also cook the internal volume of the whip. Some bubbles will remain intact. The intact and burst bubbles, and the membranes formed between the bubbles, provide flexibility and surface texture similar to that of flour food products. The protein to water ratio defines the fiberlike structure of the membranes and thus the flexibility and surface texture. Cooking the protein-rich food product in the described manner prevents sulfur-containing amino acids, e.g. cysteine and methionine, from releasing hydrogen sulfide, thereby allowing production of protein-rich food products that do not smell like eggs. The combination of these composition of matter and process factors produce protein-rich food products surprisingly similar to flour food products in appearance but significantly healthier due to the replacement of processed carbohydrates with protein.

In various embodiments, protein-rich food products comprise protein and water. In variations thereof, protein-rich food products consist substantially of protein and water. In some variations, protein consists substantially of albumen protein, also referred to as egg white protein. In some variations, protein consists substantially of albumen and whey protein. In one example of the present variation, protein consists substantially of at least 60% albumen and the remainder of whey protein. In other variations, protein comprises albumen and one or more of whey protein, soy protein, and any other type of protein. In another example, solids in the protein-rich food products consist of at least 70 wt. % protein. In a further example, solids in the protein-rich food products consist of at least 80 wt. % protein. The protein-rich food products may comprise non-protein ingredients. If the protein content is too low, the whip will not produce a product having sufficient tensile strength. If the protein content is too high, on the other hand, the product will be tough and unappealing to consumers.

In various embodiments, the protein mixture may include more than 10.75 wt. % but less than 29 wt. % of dehydrated or powder albumen such that the protein mixture includes more than 10 wt. % but less than 27 wt. % solids from albumen. In various embodiments, such as embodiments which produce pancakes, the protein mixture may include about 18 to 27 wt. % solids from albumen, while in other embodiments, such as embodiments which produce tortillas or wraps, the protein mixture may include about 12-20 wt. % solids from albumen. Examples of protein mixtures with 12-20 wt. % albumen solids are shown in Table 1 below. Generally, dehydrated albumen comprises 7 wt. % water, and thus comprises 93 wt. % solids, including protein and other solids. Generally, dehydrated albumen comprises approximately 80 wt. % protein. Thus, solids from albumen of more than 10 wt. % but less than 22 wt. % correspond to protein percentages of more than 8.60 wt. % but less than 18.92 wt. %, and 12-20 wt. % solids from albumen corresponds to 10.3-17.2 wt. % protein. As used herein, a protein-rich food product comprises at least 8.6 wt. % protein and 69 wt. % water, with the remainder including natural albumen solids other than protein and, optionally, binders, additives, and other components. By contrast, albumen found in a shell egg comprises approximately 11 wt. % solids. In one example of the present embodiment, the protein mixture includes about 12-20 wt. % albumen solids. In another example of the present embodiment, the protein mixture includes about 10.3-17.2 wt. % protein and at least 69 wt. % water. In another variation, the protein mixture consists substantially of about 14-18 wt. % albumen solids. In one example of the present variation, the protein mixture comprises about 12 wt. % albumen solids and at least 69% water. The ratios of protein and albumen are preferably selected to produce suitable protein-rich food products at various price points based on the cost and availability of different proteins. In products such as savory tortilla or pizza crust, the additives form a heterogeneous whip by the addition of, for example, seeds. Therefore while the solids weight % increases by the addition of seeds, the addition of such seeds might not change the structural composition of the protein-rich food product.

In various embodiments, the protein mixture may also include a binder or stabilizer. The binder or stabilizer may be a polysaccharide or a vegetable gum. Example gums include xanthan, guar, locust bean, and cellulose gum. Example polysaccharides include agar agar and pectin. Other binders or stabilizers may also be used.

An exemplary protein-rich egg-containing food product of the present disclosure may have similar properties (e.g., strength, density, flavor, texture, and/or appearance) as a comparable and traditional flour-based food product. A consumer may be encouraged to select the egg-containing food product to capture the health benefits without sacrificing other properties of the traditional flour-based food product. Thus, it may be desirable to minimize or avoid the flavor, texture, and/or appearance of a traditional fried egg.

Figure 2:
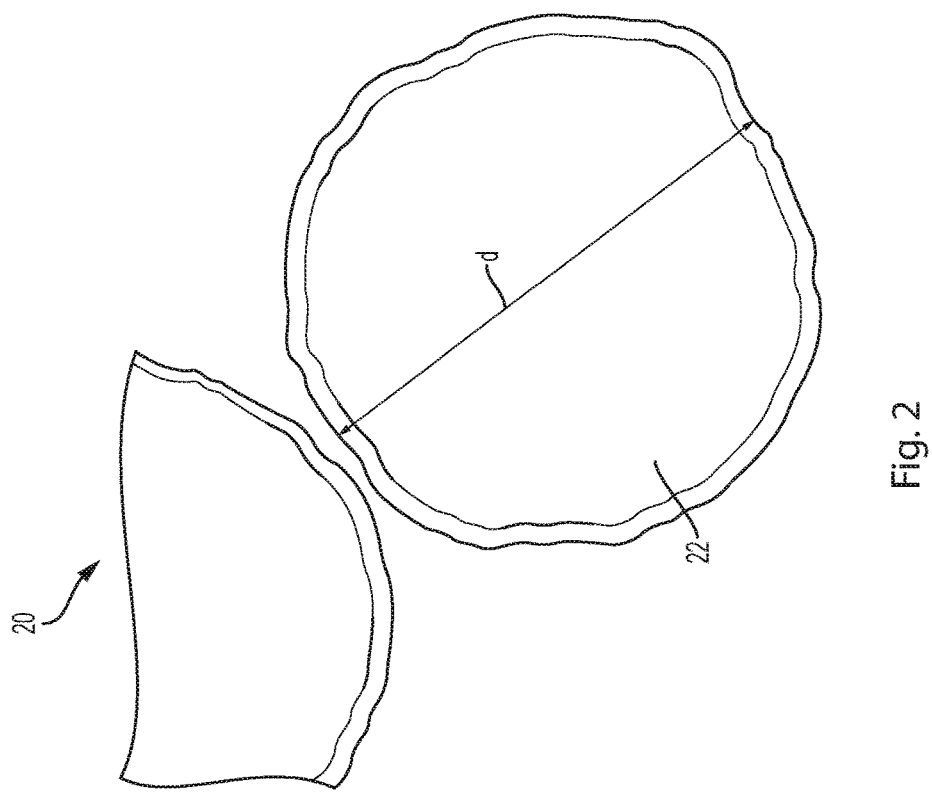
FIG. 2 shows a top view of the protein-rich tortilla of FIG. 1, unwrapped.
Figure 3:
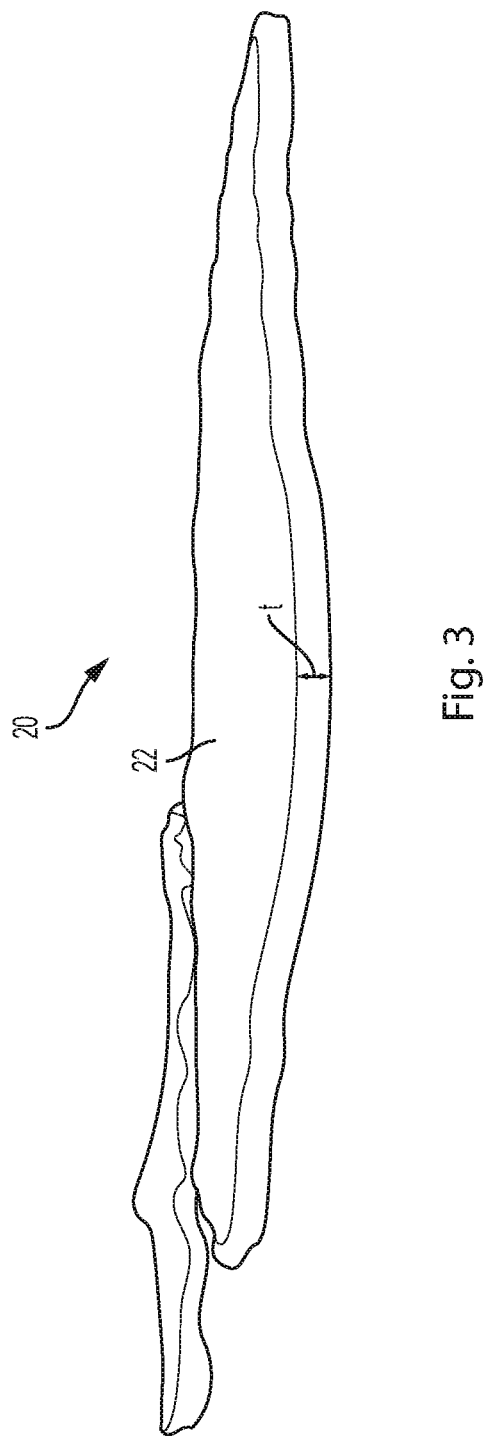
FIG. 3 shows a side view of the protein-rich tortilla of FIG. 2.
Figure 4:
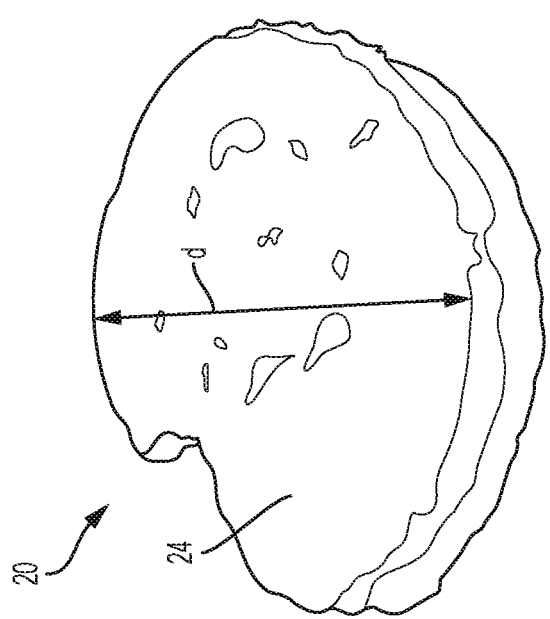
FIG. 4 shows a perspective view of a protein-rich pancake made in accordance with embodiments of the present disclosure.
Figure 5:
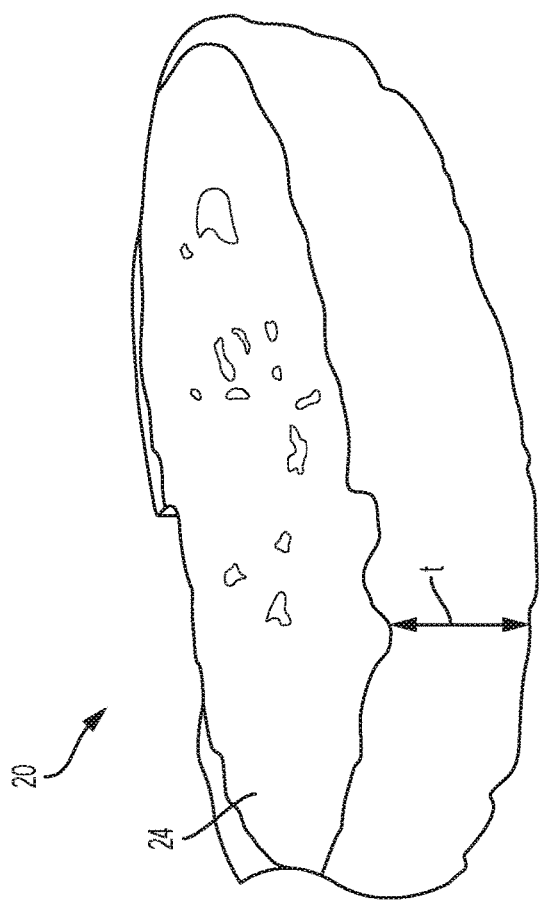
FIG. 5 shows another perspective view of the protein-rich pancake of FIG. 4.
Figure 6:
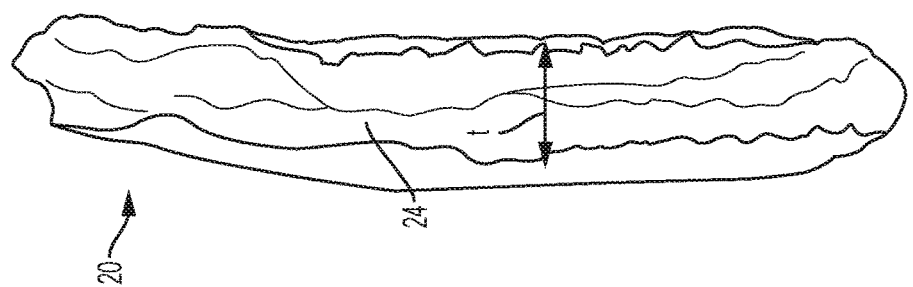
FIG. 6 shows a cross-sectional view of the protein-rich pancake of FIG. 5.
Figure 7:
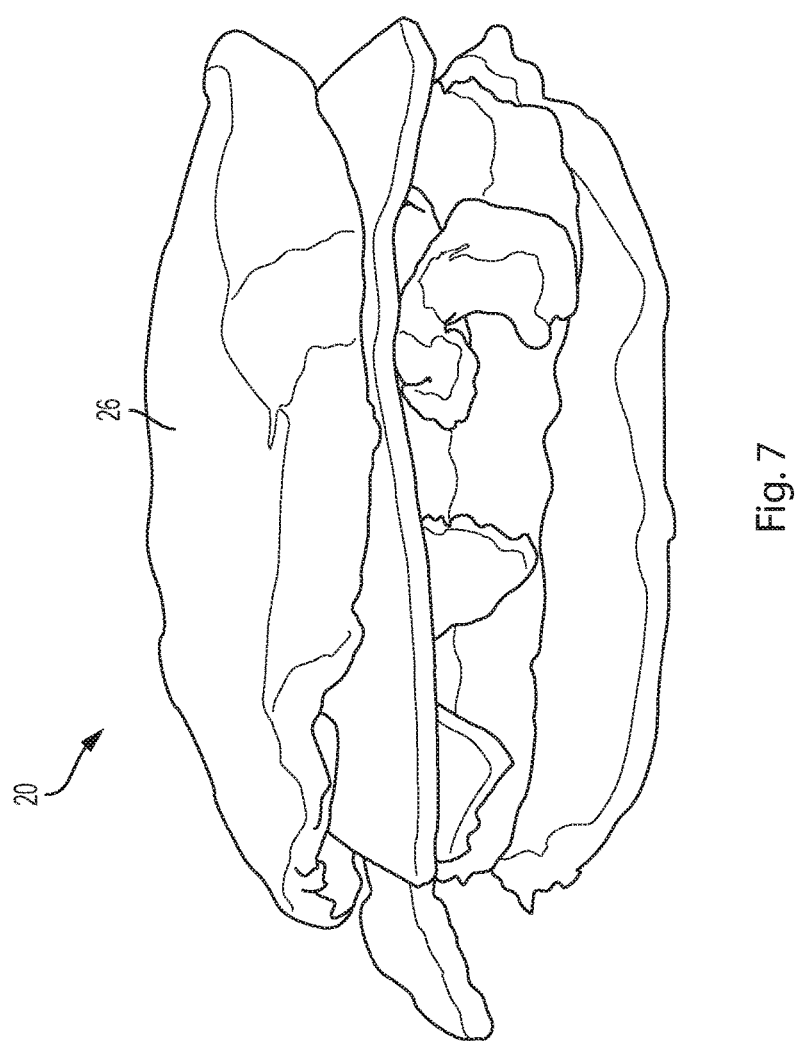
FIG. 7 shows a perspective view of protein-rich buns, made in accordance with embodiments of the present disclosure, sandwiching meats and cheese.
Figure 8B:
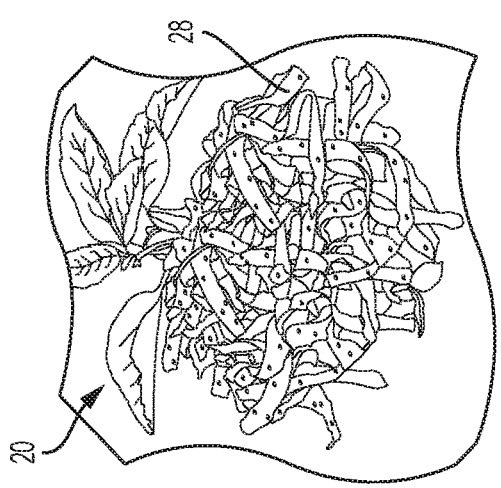
FIGS. 8a-d show perspective views of a protein-rich pasta made in accordance with embodiments of the present disclosure, having an elongate shape.
Figure 8D:
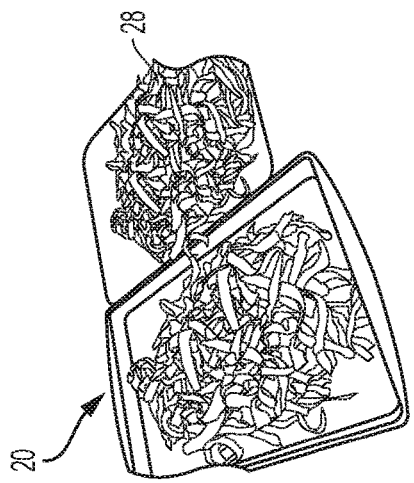
Figure 8A:
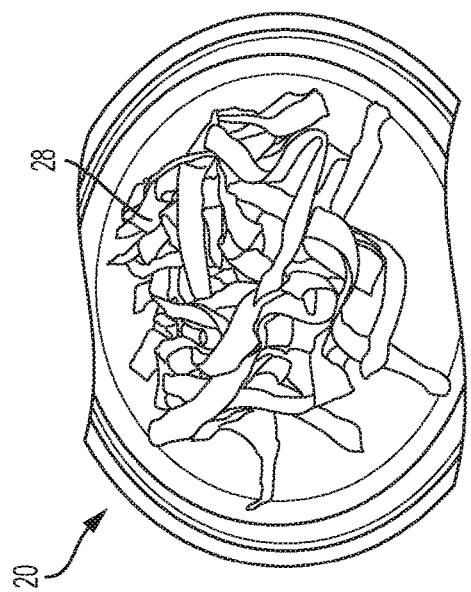
Figure 8C:
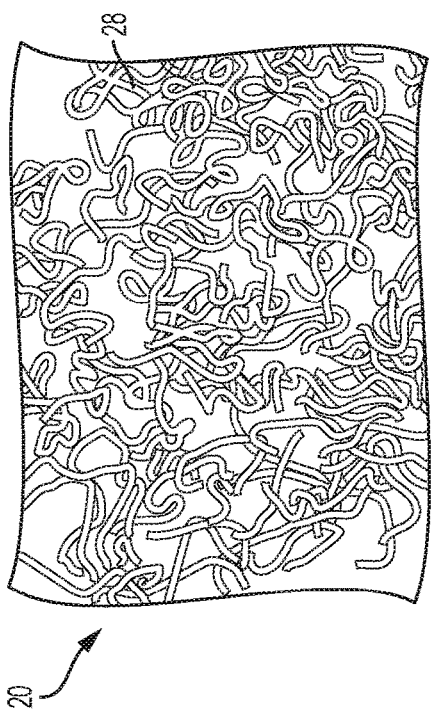
Figure 9:
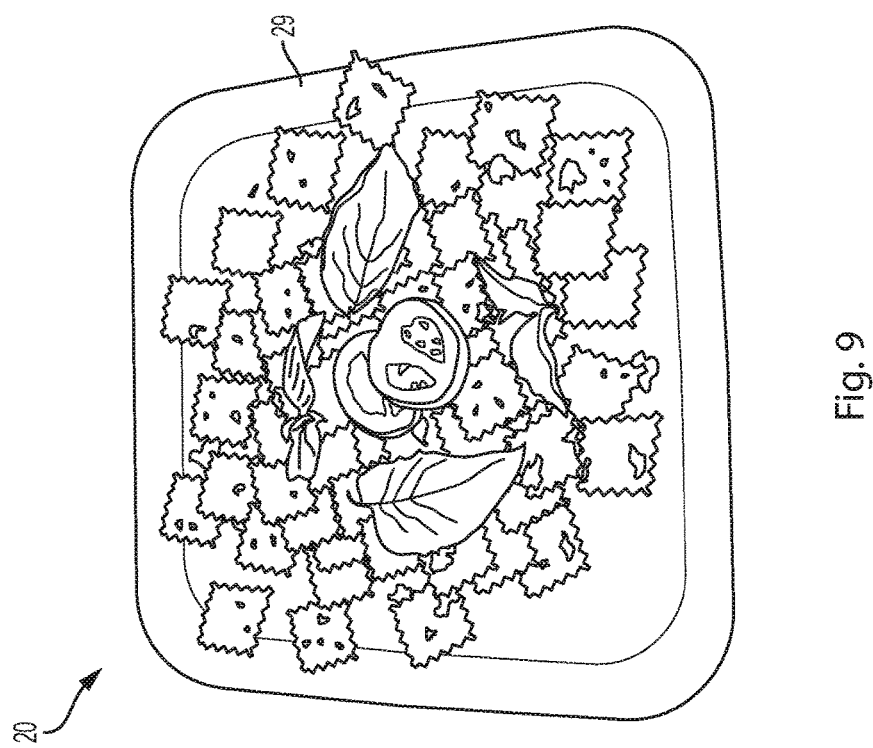
FIG. 9 shows a perspective view of another protein-rich pasta made in accordance with embodiments of the present disclosure, having a square shape.
Figure 10:
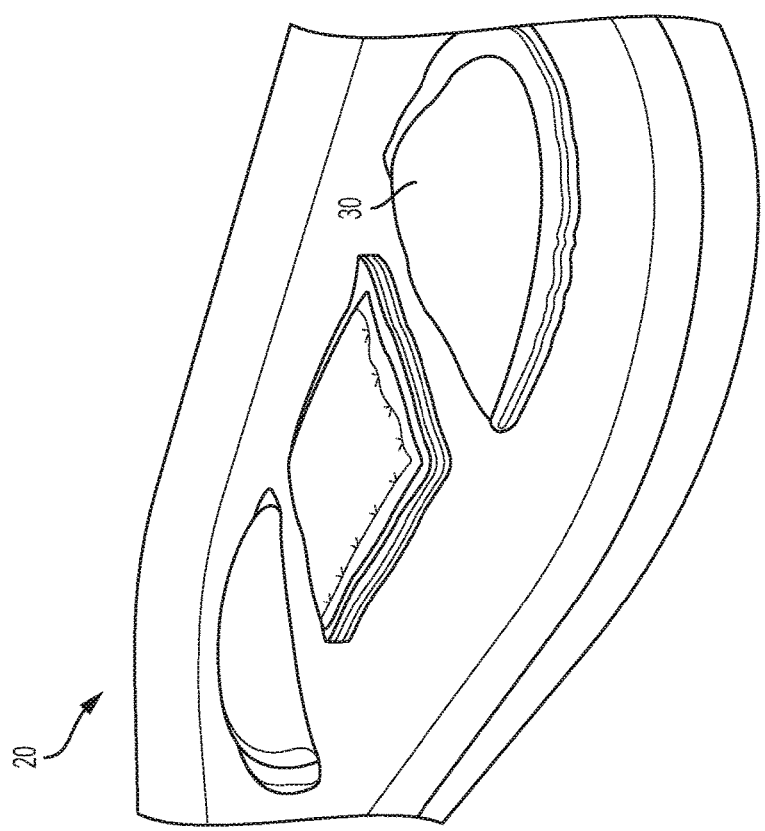
FIG. 10 shows a perspective view of a protein-rich pasta made in accordance with embodiments of the present disclosure, having a folded or stuffed ravioli shape.
Figure 11:
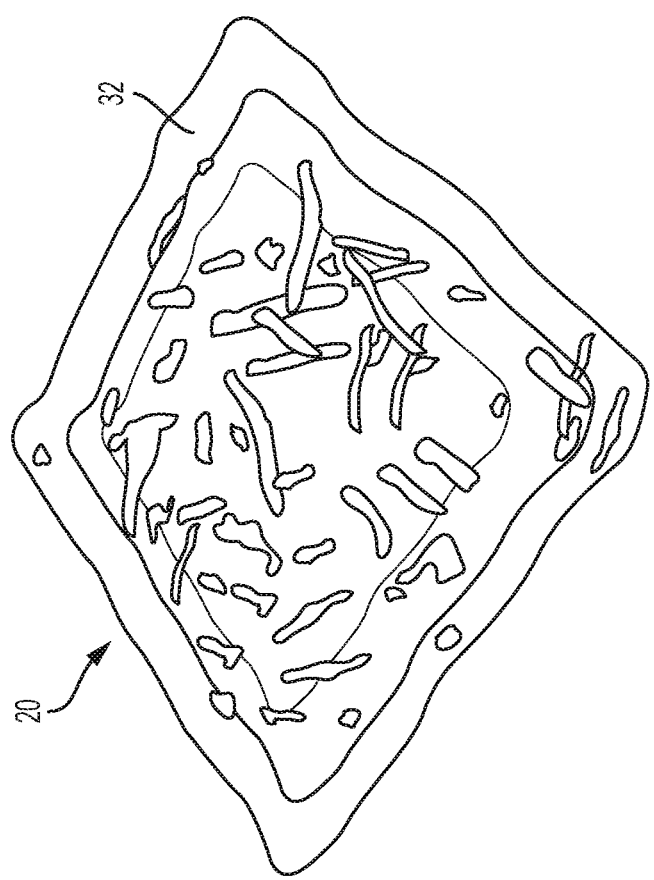
FIG. 11 shows a perspective view of protein-rich enclosed pocket having a filled interior made in accordance with embodiments of the present disclosure.
Figure 12:
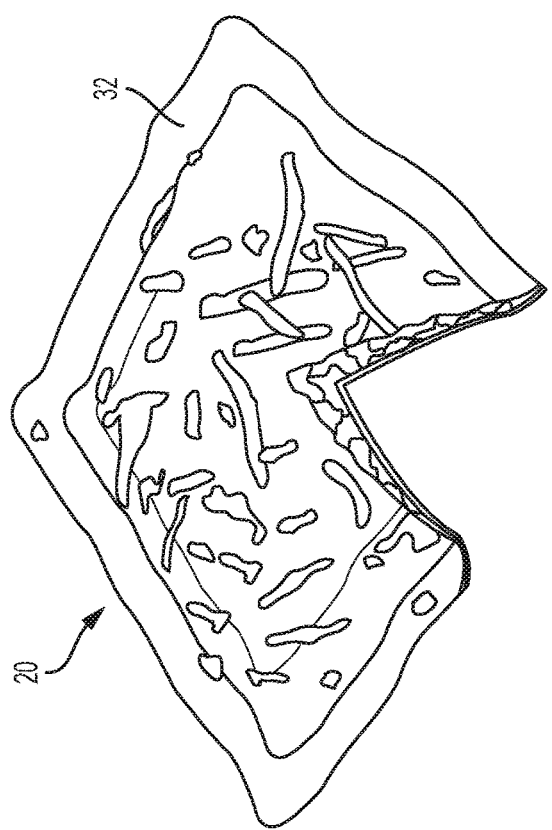
FIG. 12 shows a perspective view of the protein-rich enclosed pocket of FIG. 11 with a portion removed to illustrate its filled interior.
Figure 13:
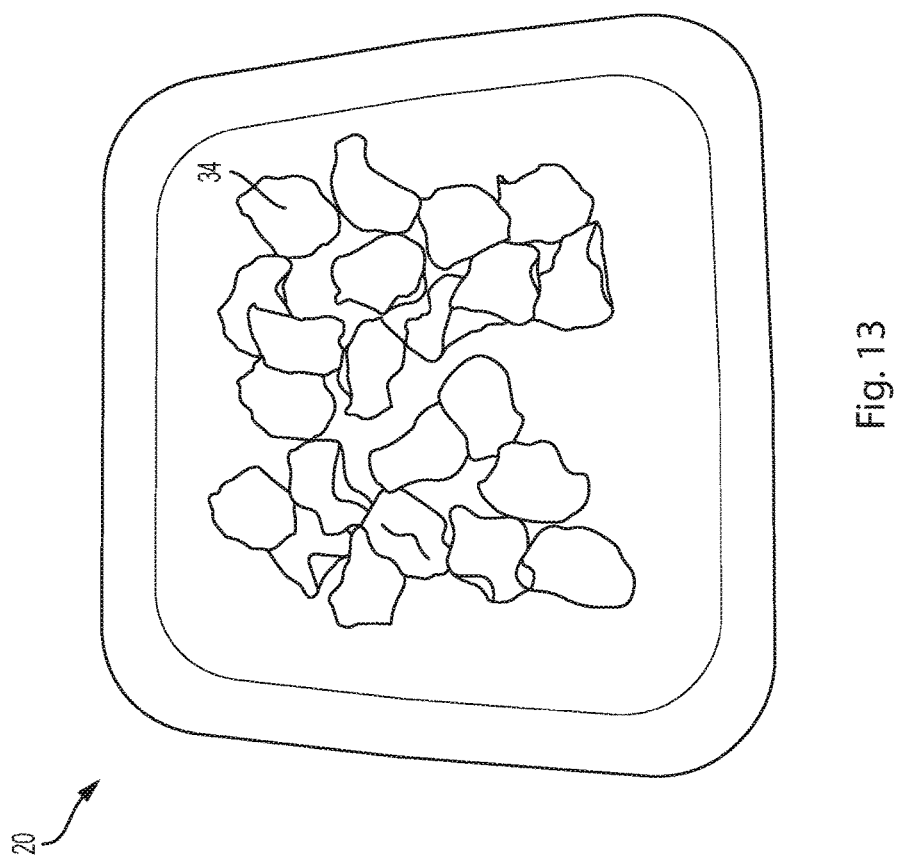
FIG. 13 shows a perspective view of protein-rich chips made in accordance with embodiments of the present disclosure.
Figure 14:
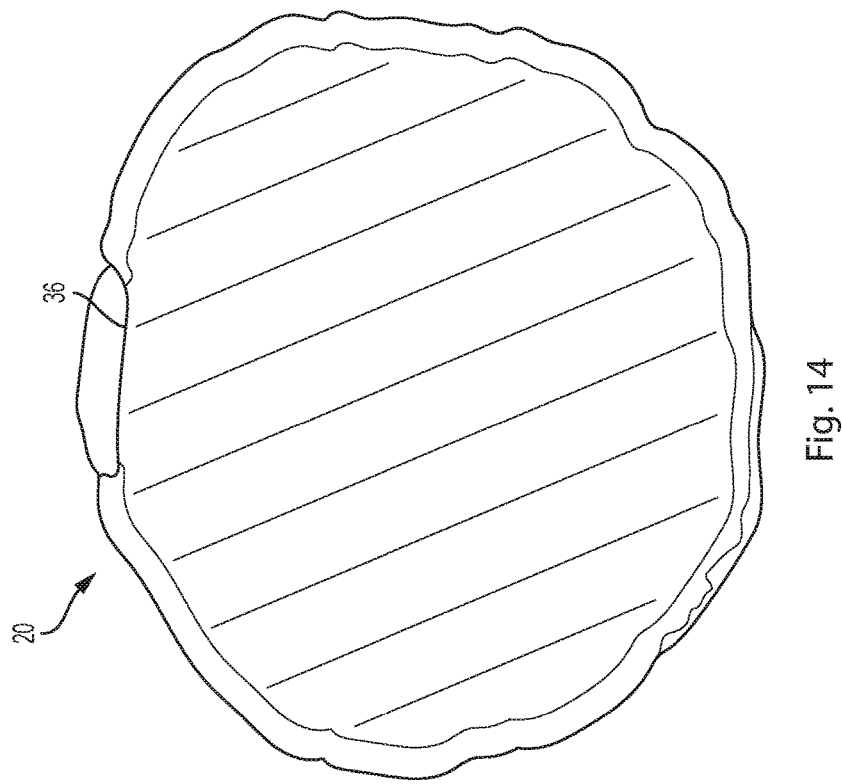
FIG. 14 shows a perspective view of a protein-rich pizza crust made in accordance with embodiments of the present disclosure.
Figure 15:
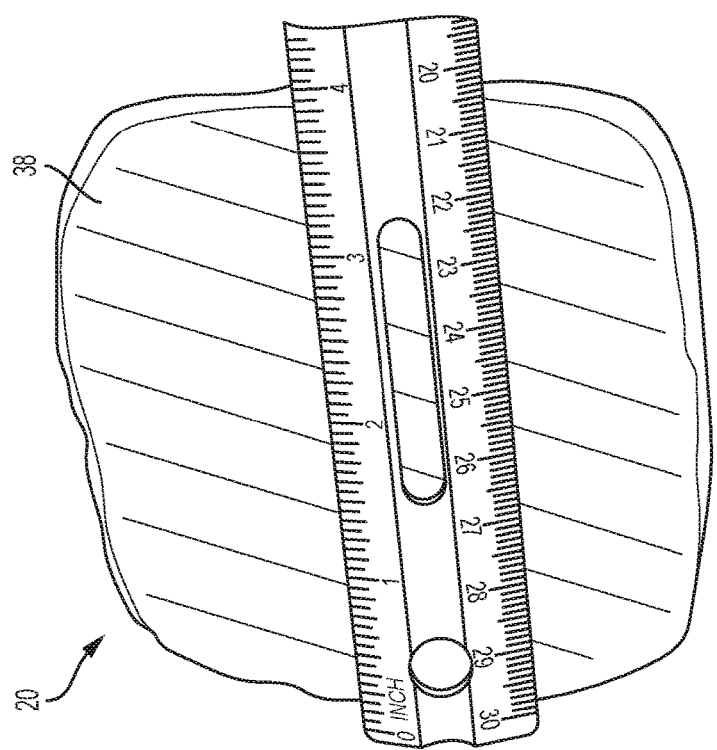
FIG. 15 shows a perspective view of a protein-rich bread made in accordance with embodiments of the present disclosure.

A number of protein-rich food products 20 made in accordance with embodiments of methods described herein are shown in FIGS. 1-15. FIGS. 1-3 show a cooked protein-rich food product 20 comprising a tortilla 22 used to make a wrap, shown in FIG. 1. The diameter d and thickness t of tortilla 22 are depicted in FIGS. 2 and 3. A pancake 24 is shown in FIGS. 4-6. The diameter d and thickness t of pancake 24 are depicted in FIGS. 4-6. As shown in FIGS. 2-6, the diameter of pancake 24 is generally less than the diameter of tortilla 22 and the thickness of pancake 24 is generally greater than the thickness of tortilla 22. A hamburger bun 26, a pasta 28 with an elongate shape, a pasta 29 with a square shape, a pasta 30 with a ravioli-like shape, a turnover 32 stuffed with other ingredients, chips 34, a pizza crust 36, and a bread 38, are shown in FIGS. 7, 8a-d, and 9-15, respectively.

Figure 16:
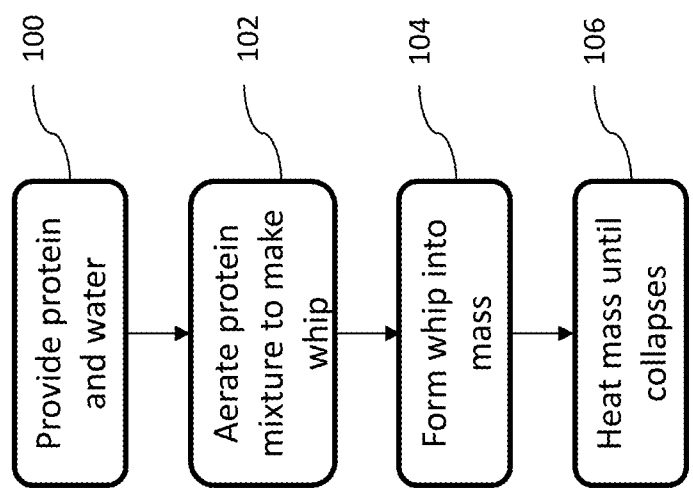
FIG. 16 is a flowchart of a method of making protein-rich food products shown in FIGS. 1-15.

FIG. 16 is a flowchart of an embodiment of a method for making a protein-rich food product. In the present embodiment the method comprises, at 100, providing protein and water. Protein may be comprised in liquid albumen, albumen powder, and optionally other protein types in combination with albumen. Optionally, the mixture may be stirred or mixed to reconstitute powders.

At 102, the protein mixture is aerated to make a whip. Aerating may be performed by whipping the mixture for a length of time. Whipping comprises agitating the mixture with a whip at a speed sufficient to decrease the density of the mixture. As the mixture includes at least 69 wt. % water, which has a density of 1.0 g/cm$^3$, the density of the mixture may approximate 1.0 g/cm$^3$. Whipping reduces the density to 0.20 g/cm$^3$ or less, preferably 0.15 g/cm$^3$ or less, and even more preferably between and inclusive of 0.10-0.13 g/cm$^3$. If solids are added before or during aeration that do not homogenize with the protein mixture, the weight of the solids can be used to determine the density of the whip exclusive of the solids.

At 104, the whip is formed into a mass. Forming a mass may include depositing the whip in a mold. The mass of whip will then have a first thickness. The first thickness may be a result of the mold pressing on the mass or the mass resting on the mold without being pressed.

At 106, the mass of whip is heated until it collapses. The mass of whip collapses when its thickness decreases from the first thickness. A heat shield may be provided to retain heat around the whipped mixture to cook its periphery at substantially the same rate as the center of the whipped mixture. However, the whipped mixture does not necessarily contact the heat shield. The heat shield may be a ring positioned between the hot surfaces and having a height smaller, equivalent, or larger than the desired spacing and a diameter larger than the diameter of the cooked protein-rich food product. Optionally, the mass may be removed from the mold and further heated to complete cooking. In various embodiments, the protein-rich food product is subsequently cooled. The cooled protein-rich food product may then be frozen to increase the shelf life of the protein-rich food product. Heating may be performed by heating the mold, infrared or microwave heating, steam heating and other known heating mechanisms.

Figure 17:
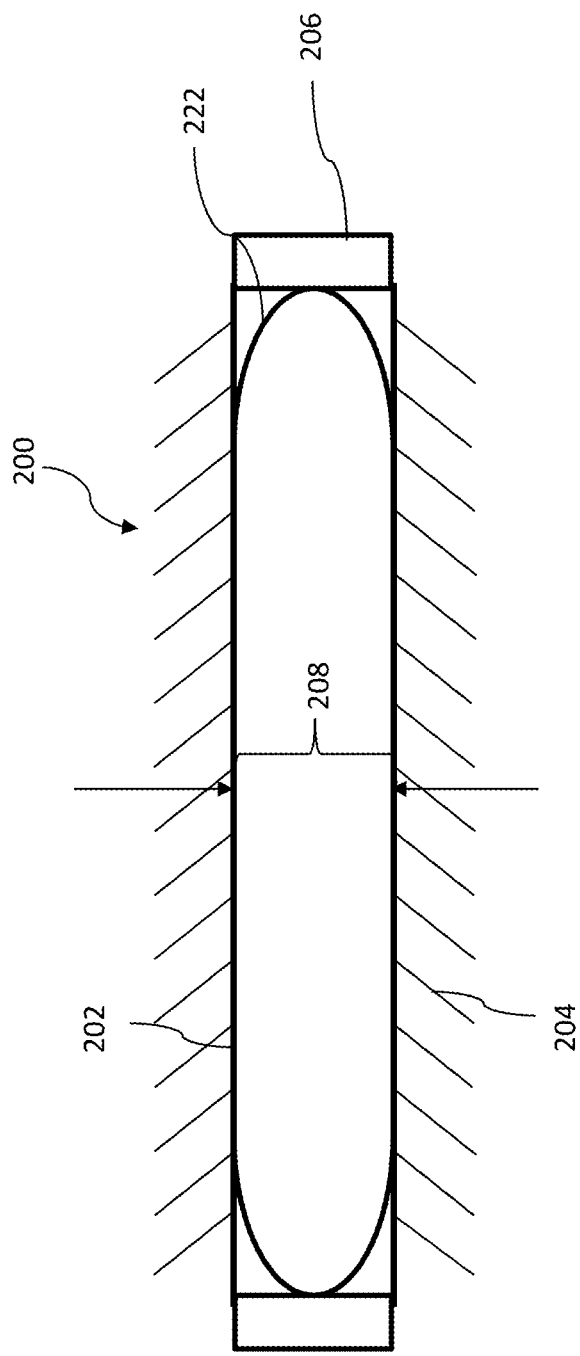
FIG. 17 is a schematic diagram of a mold showing a mass of whip therein.

FIG. 17 is a schematic diagram of a mold 200 comprising first and second platens 202, 204, and optional spacers 206. A cavity inside mold 200 contains a mass of whip 222 formed in accordance with the method described in FIG. 16. For example, the mass of whip 222 may be deposited onto second platen 204 and then first platen 202 may be positioned to press onto the mass of whip 222 until first platen 202 is supported by spacers 206, thereby defining a first thickness 208 of the mass of whip, between first and second platens 202, 204. The mass of whip 222 may expand as it is heated and may temporarily lift first platen 202.

Figure 18:
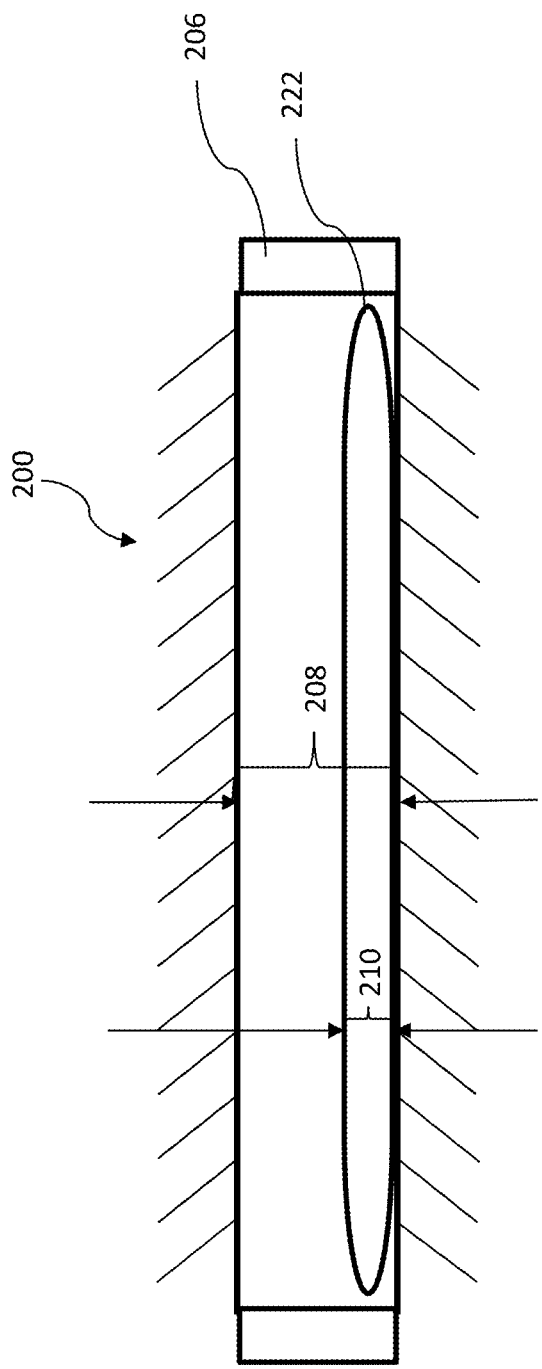
FIG. 18 is a schematic view of the mold of FIG. 17 showing the mass of whip in a collapsed state.

FIG. 18 is a schematic diagram of mold 200 showing the mass of whip 222 collapsed such that it has a second thickness 210 which is less than first thickness 208. In one example, second thickness 210 is 50% or less of first thickness 208. In another example, second thickness 210 is 30% or less of first thickness 208. In various embodiments, the second thickness 210 is approximately 3 millimeters or less. In one example, the second thickness 210 is about 0.65 to about 2.9 millimeters. The desired thickness may affect cooking time. About 5-40 wt. % of the water contained by the whip may evaporate during heating or subsequent cooling. The final moisture content of the protein-rich food products may be, for example, between 65 and 78 weight %.

Albumen comprises de-sugared, powdered or liquid, albumen, or combinations thereof. The albumen may be pasteurized after liquid albumen is dehydrated into powder form or the liquid albumen itself may be pasteurized. De-sugaring is effected by subjecting the liquid albumen to the action of a bacteria, enzyme, or yeast at a temperature of between 70-100° F. and pH from about 6 to 7. Example bacterias include *Lactobacilli, Streptococci,* and *Aerobacter.* Yeast may be ordinary baker's yeast. An enzyme may be glucose oxidase. De-sugaring methods are well known in the art. In one variation, the liquid albumen may be filtered to remove minerals from the albumen, thereby removing a source undesired flavor. Ultrafine filters or membranes may be used to filter out minerals and some or a substantial portion of the sugar from the albumen.

Powdered albumen is produced by dehydrating liquid albumen. In one example, liquid albumen flows through a nozzle whereupon it is atomized and discharged into a heated dryer chamber. A continuous flow of accelerated heated air extracts most of the moisture from the atomized liquid albumen. The dehydrated albumen is then removed from the chamber. In another example, albumen is deposited on trays or pans or drums and heated in an oven until dry.

In a variation of the present embodiment, making a protein-rich food product comprises providing a protein mixture of albumen and water, forming a protein mixture comprising up to about 20 wt. % albumen solids, whipping the protein mixture to form a whip having a density of less than 0.2 g/cm$^3$, optionally mixing additives with the whipped mixture, depositing a portion of the whip into a mold (FIG. 17), heating the whip to cause it to expand, allowing the expanded mixture to collapse (FIG. 18), and heating the collapsed mixture for a second predetermined time. In one variation, the collapsed mixture is heated in the mold. In another variation, the collapsed mixture is heated outside the mold. For example, the collapsed mixture may be transferred to a conventional oven and heated for the second predetermined time (i.e., 1-3 minutes). Heating outside the mold may be desirable to increase commercial production speed, which may be limited by the batch forming of the whip in the mold.

In various embodiments, the protein-rich food product may also include additives. As used herein additives are components generally introduced post-whipping. However, various additives, such as preservatives, stabilizers, binders, and salt may be incorporated pre-whipping. Example additives include seeds (i.e., caraway, flax, hemp, sesame, etc.), yolk, olive oil, honey, spices, cheeses, meats, vegetables, preservatives, and any other condiment or component provided post-whipping. Additives may be introduced to enhance flavor, texture, color, or any other characteristic of the protein-rich food products.

An example of the method will now be described. The present example was implemented to produce a suitable protein tortilla. The characteristics of the protein tortilla will also be described. The method begins with providing a mixture of protein and water. The protein is comprised within pasteurized de-sugared powdered albumen. The powdered albumen and water are provided at a 20 wt. % ratio of powder to water (e.g. 91 grams of powder and 454 grams of water). The albumen and water are placed in the bowl of a mixer. An example mixer is a stainless steel Kitchen Aid® Professional 600™ mixer ("KAP 600 Mixer"). The KAP 600 Mixer has 10 discrete speeds, a six quart bowl, and a six wire whisk. The six wire whisk has an oval shape and an elongate edge configured to periodically pass near the surface of the bowl. The ingredients may be mixed by hand to disperse the powdered albumen in the water before whipping.

After the powdered albumen and water were combined, the protein mixture was mixed and whipped with the six wire whisk in the KAP 600 Mixer at speed 3 for 1 minute, speed 6 for 1 minute, and speed 10 for 3 minutes to form the whipped mixture, or whip. Speeds 1, 6 and 10 correspond to approximately 115, 180, and 280 revolutions per minute. Accordingly, the protein mixture was mixed and whipped for a total of 5 minutes. The times and speeds for the initial minutes may vary significantly without affecting the final product. If additives are added after whipping, an additional 0.5-2.0 minutes of whipping and/or mixing may be carried out to disperse the additives.

A portion of the whip was then placed in a hot press, which may be referred to as a mold. A Cuisinart Elite Collection Griddler model GR-300WS was used, with top and bottom flat platens set to 350° F. Four 7/16 inch (11.11 milimeters) spacers were placed at the corners of the bottom platen. A release agent (e.g. Sysco Supreme) was sprayed on the platens. Then, 35 grams of whip was placed on the bottom platen. The top platen was lowered and the whip was thus heated for 30 seconds on each side at the same time. The platen includes a peripheral wall that partially encloses the space between the flat surfaces of the platens, to retain heat. Then, the product was placed on a cooling rack for 30 minutes. As shown in Table 1 below, the products were 2-3 millimeters thick. When the platen is lowered the upper platen presses on the whip, which spreads. The whip subsequently collapses from the 11.11 millimeters thickness imposed by the platens to the final thickness, shown to be between 2-3 millimeters.

The present example was tested as described below after the cooling period. Additional samples were made using the same method but with different albumen/water ratios to achieve different percent solids content. The following results were obtained.

TABLE 1

Protein-rich Tortillas

| Characteristic: | Solids % | | | | | | |
|---|---|---|---|---|---|---|---|
| | 10.26% | 12.16% | 14.31% | 16.22% | 17.98% | 20.08% | 21.99% |
| Whip density: | 0.12 | 0.12 | 0.12 | 0.12 | 0.13 | 0.12 | 0.13 |
| Whip index: | 5.50 | 5.75 | 6.00 | 4.50 | 4.25 | 4.50 | 5.00 |
| Diameter: | 11.25 | 7.00 | 7.00 | 7.25 | 6.94 | 7.50 | 7.50 |
| Tear strength: | Fail | 155.82 | 202.28 | 243.62 | 243.77 | 760.02 | 907.03 |
| Burst force: | Fail | 52.17 | 263.47 | 212.19 | 212.38 | 278.77 | 403.69 |
| Thickness: | Fail | 2.12 | 2.82 | 2.80 | 2.87 | 2.84 | 3.36 |

Solids is measured as a weight percentage of the mixture; whip density is in grams/centimeter$^3$, whip index is in inches, diameter is in inches, tear strength and burst force are in grams of force, and thickness is in millimeters. Examples made from whips with about 12 to about 20 wt. % solids provided acceptable protein-rich food products which had tear strengths between about 150 to about 760 grams of force, burst forces of about 50 to about 280 grams of force, and thicknesses of about 2 to about 3 millimeters. The foregoing samples contained only albumen protein.

Another example was implemented to produce a savory protein-rich tortilla. The same production and testing methods were used. The mixtures comprised, in addition to albumen, approximately 20 grams of egg yolk powder, and approximately 5 grams of each of white sesame seed, black sesame seed, brown flax seed, golden flax seed, and hemp, which were added to the protein mixture after whipping. Samples were made using different albumen/water ratios, which were similar to percentage solids contents indicated in Table 1, to achieve different total percent solids content. The results are shown in Table 2 below.

TABLE 2

Savory Protein-rich Tortillas

| Characteristic: | Total Solids % | | | | | | |
|---|---|---|---|---|---|---|---|
| | 14.34% | 18.33% | 20.85% | 21.15% | 26.14% | 26.50% | 26.84% |
| Whip density: | 0.16 | 0.18 | 0.17 | 0.25 | 0.18 | 0.27 | 0.16 |
| Whip index: | 4.00 | 4.19 | 4.19 | 4.50 | 4.50 | 4.50 | 4.00 |
| Diameter: | Fail | 5.7 | 4.5 | 5.5 | 5.5 | 5.5 | 4.3 |
| Tear strength: | Fail | 232.4 | 100.09 | 205.87 | 232.39 | 226.23 | 297.04 |
| Burst force: | Fail | 222.30 | 114.82 | 277.80 | 366.08 | 380.85 | 318.00 |
| Thickness: | Fail | 1.09 | 1.32 | 1.60 | 1.57 | 1.51 | 2.14 |

Examples made from whips with about 12 to about 20 wt. % albumen solids or about 18 to about 27 wt. % total solids provided acceptable protein-rich food products which had tear strengths between about 100 to about 300 grams of force, burst forces of about 110 to about 385 grams of force, and thicknesses of about 1 to about 2 millimeters.

Another example was implemented to produce a suitable protein-rich pasta. The same production and testing methods were used. The mixture comprises, in addition to albumen, approximately 60 grams of egg yolk and approximately 30 grams of olive oil, which were added to the protein mixture after whipping. Samples were made using different albumen/water ratios, which were similar to percentage solids contents indicated in Table 1, to achieve different total percent solids content. The results are shown in Table 3 below.

TABLE 3

Protein-rich Pasta

| Characteristic: | Total Solids % | | | | | | |
|---|---|---|---|---|---|---|---|
| | 13.72% | 14.84% | 20.80% | 22.26% | 24.71% | 26.15% | 30.41% |
| Whip density: | 0.12 | 013 | 0.14 | 0.14 | 0.14 | 0.14 | 0.14 |
| Whip index: | 5.000 | 4.750 | 4.500 | 5.000 | 4.125 | 4.000 | 4.750 |
| Diameter: | 9.00 | 8.50 | 8.50 | 8.50 | 8.00 | 7.38 | 8.00 |
| Tear strength: | 191.55 | 101.73 | 132.23 | 134.43 | 144.34 | 185.20 | 258.92 |
| Burst force: | 210.92 | 173.05 | 183.49 | 267.09 | 299.73 | 370.73 | 423.65 |
| Thickness: | 0.65 | 1.08 | 0.83 | 0.90 | n/a | 1.20 | 1.32 |

Examples made from whips with about 12 to about 20 wt. % albumen solids or about 14 to about 27 wt. % total solids provided acceptable protein-rich food products which had tear strengths between about 100 to about 260 grams of force, burst forces of about 170 to about 425 grams of force, and thicknesses of about 0.8 to about 1.3 millimeters.

Additional examples were implemented to produce a suitable protein tortilla including a stabilizer. The mixtures comprised, in addition to albumen, a stabilizer, namely approximately 0.2-0.8 wt. % xanthan gum or guar gum. Samples were made using different amounts of the gums to see the effect of the amount of the gum on the protein product. The results are shown in Table 4 (xanthan gum) and Table 5 (guar gum) below.

TABLE 4

Xanthan Gum

| Characteristic: | Solids % | | | | | | |
|---|---|---|---|---|---|---|---|
| | 17.62% | 16.76% | 17.50% | 17.87% | 18.03% | 17.16% | 18.28% |
| Stabilizer | 0.20% | 0.30% | 0.40% | 0.50% | 0.60% | 0.70% | 0.80% |
| Whip density: | 0.12 | 0.12 | 0.12 | 0.12 | 0.11 | 0.11 | 0.10 |
| Whip index: | 5.00 | 5.00 | 5.88 | 5.75 | 5.70 | 5.00 | 3.00 |
| Diameter: | 6.90 | 7.20 | 7.00 | 7.00 | 7.50 | 7.00 | 7.25 |
| Tear strength: | 178.35 | 195.34 | 217.95 | 190.82 | 237.32 | 167.62 | 232.25 |
| Burst force: | 315.43 | 250.27 | 343.96 | 336.76 | 307.36 | 342.75 | 329.15 |
| Thickness: | 1.27 | 1.2 | 1.12 | 1.34 | 1.21 | 1.01 | 1.16 |
| Weep: | 120+ | 120+ | 120+ | 120+ | 120+ | 120+ | 120+ |

TABLE 5

Guar Gum

| Char-acteristic: | Solids % | | | | | |
|---|---|---|---|---|---|---|
| | 17.29% | 17.56% | 17.53% | 17.61% | 17.66% | 17.66% |
| Stabilizer: | 0.10% | 0.20% | 0.30% | 0.40% | 0.50% | 0.60% |
| Whip density: | 0.12 | 0.11 | 0.12 | 0.13 | 0.13 | 0.14 |
| Whip index: | 4.56 | 5.00 | 5.25 | 4.75 | 4.75 | 3.50 |
| Diameter: | 7.00 | 6.80 | 8.25 | 7.50 | 7.00 | 7.00 |
| Tear strength: | 176.84 | 179.96 | 182.66 | 210.79 | 262.32 | 195.87 |
| Burst force: | 256.72 | 267.79 | 228.60 | 366.39 | 331.07 | 304.62 |
| Thickness: | 1.200 | 1.050 | 0.990 | 1.130 | 0.986 | 1.320 |
| Weep: | 33 | 30 | 11 | 13 | 20 | 22 |

Weep is defined as the amount of time for the whip to begin to turn back into a liquid form, and is measured in minutes. Each of the examples made provided acceptable protein-rich food products which had tear strengths between about 175 to about 265 grams of force, burst forces of about 225 to about 370 grams of force, and thicknesses of about 0.9 to about 1.4 millimeters.

Another example was implemented to produce a suitable protein tortilla using various types of other proteins along with the egg albumen protein. Approximately 2 wt. % to 8 wt. % of other types of proteins were added to approximately 12 wt. % of the egg albumen solids to provide total solids of approximately 14 wt. % to 20 wt. %. The other types of proteins included whey, soy, and pea proteins. The results for the pea protein are shown below in Table 6, the results for the whey protein are shown below in Table 7, and the results for the soy protein are shown below in Table 8.

TABLE 6

12 Wt. % Egg Albumen Plus Pea Protein

| Characteristic: | Total Solids % | | | |
|---|---|---|---|---|
| | 15.08 | 17.83 | 18.69 | 20.48 |
| Pea Protein Solids: | 2.00% | 4.00% | 6.00% | 8.00% |
| Whip density: | 0.14 | 0.16 | 0.21 | 0.24 |
| Whip index: | 4.25 | 4.00 | 3.00 | n/a |
| Diameter: | 5.70 | 5.25 | 5.10 | 4.50 |
| Tear strength: | 115.83 | 156.25 | 172.85 | 233.57 |
| Burst force: | 156.15 | 208.18 | 312.92 | 359.53 |
| Thickness: | 1.06 | 1.45 | 2.28 | 3.19 |

Each of the examples made provided acceptable protein-rich food products which had tear strengths between about 110 to about 235 grams of force, burst forces of about 150 to about 360 grams of force, and thicknesses of about 1.0 to about 3.2 millimeters.

TABLE 7

12 Wt. % Egg Albumen Plus Whey Protein

| Characteristic: | Total Solids % | | | | |
|---|---|---|---|---|---|
| | 14.28% | 16.56% | 18.40% | 20.36% | 22.09% |
| Whey Protein Solids: | 2.00% | 4.00% | 6.00% | 8.00% | 10.00% |
| Whip density: | n/a | 0.20 | 0.20 | 0.29 | 0.30 |
| Whip index: | n/a | 3.00 | 2.75 | 2.50 | 2.00 |
| Diameter: | 7.00 | 5.50 | 5.30 | 5.60 | 3.80 |
| Tear strength: | 203.2 | 167.14 | 218.93 | 236.13 | 212.33 |
| Burst force: | 183.05 | 340.03 | 381.93 | 383.17 | 446.60 |
| Thickness: | 1.40 | 2.28 | 1.75 | 2.56 | 2.63 |

Each of the examples made provided acceptable protein-rich food products which had tear strengths between about 165 to about 240 grams of force, burst forces of about 180 to about 450 grams of force, and thicknesses of about 1.3 to about 2.7 millimeters.

TABLE 8

12 Wt. % Egg Albumen Plus Soy Protein

| Characteristic: | Total Solids % | | | | |
|---|---|---|---|---|---|
| | 14.45% | 14.97% | 17.77% | 19.60% | 22.46% |
| Soy Protein Solids: | 2.00% | 4.00% | 6.00% | 8.00% | 10.00% |
| Whip density: | 0.12 | 0.12 | 0.14 | 0.14 | 0.16 |
| Whip index: | 5.125 | 5.250 | 3.000 | 3.750 | 3.750 |
| Diameter: | 7.10 | 6.00 | 6.80 | 6.00 | 5.60 |
| Tear strength: | 95.62 | 85.67 | 62.72 | 90.86 | 107.70 |
| Burst force: | 147.12 | 111.76 | 117.73 | 168.90 | 214.00 |
| Thickness: | 0.94 | 1.20 | 1.32 | 1.57 | 1.76 |

Each of the examples made provided acceptable protein-rich food products which had tear strengths between about 60 to about 110 grams of force, burst forces of about 110 to about 215 grams of force, and thicknesses of about 0.9 to about 1.8 millimeters.

The whipped blend may be whipped using a whisk for a length of time sufficient to produce a whipped mixture having a density of 0.2 g/cm³ or less. In various embodiments, the density is about 0.09 g/cm³ to about 0.15 g/cm³, or more specifically 0.10 g/cm³ to 0.13 g/cm³. The mixture may be mixed at a low speed until any dry ingredients are dispersed in the water and then whipped at a high speed for a time sufficient to form a whipped mixture having the desired density. If the whipped mixture is over-whipped, liquid will separate, or weep. In one example, whipping is performed by rotating a whisk in a mixer.

In various embodiments, the speed of whipping may range from speeds of 1 to 10 on an electric mixer, corresponding to approximately 20 revolutions per minute to 370 revolutions per minute (rpm). In one embodiment, the mixture is whipped for 0.5-2 minutes at a speed of 3, 0.5-2 minutes at a speed of 6, and 0.5-10 minutes at a speed of 10. A speed of 3 is low (approximately 55-135 rpm), a speed of 6 is medium (approximately 120-190 rpm), and a speed of 10 is high (approximately 200-370 rpm). In an exemplary embodiment, the mixture is whipped at least at a speed of 225-280 rpm for at least three minutes but no more than 10 minutes.

The speed of the whipping may remain constant throughout the whipping period, or the speed may vary, for example increase or decrease, throughout the whipping period. The whisk is operated by a mechanical mixer or by hand.

Generally, the whipped blend is cooked on a first side and a second side after whipping. For instance, the cooking conditions may include cooking both the top and the bottom of the food product at a temperature between 300-500° F. for approximately 5 seconds to 4 minutes on each side. For instance, in one example, the whipped blend may be cooked at approximately 350° F. for approximately 30 seconds to 1 minute per side. In various embodiments, the food product may be cooked longer or at a different temperature on the first side than on the second side or vice versa, and/or the food product may be placed in an oven at a temperature of 325-425° F. for approximately 5 seconds to 3 minutes. For example, the food product may be cooked at approximately 350° F. on both sides for approximately 8 seconds and then placed in an oven at 300° F. for approximately 3 minutes, or the food product may be cooked at approximately 350° F. on a first side and 400-450° F. on a second side. The cooking and/or cooling process may expand, compress, elongate, and/or collapse the air bubbles formed within the blend during the whipping step, which may create a stronger or more durable structure in the resulting food product.

The food product of the present disclosure may have similar properties (e.g., strength, density, flavor, texture, and/or appearance) as a comparable and traditional flour-based food product.

Alternatively, raw liquid egg whites cooked on both sides on a hot surface without following the present method were also tested in a similar manner to the protein-rich food products in the tables above. However, the cooked egg whites were unable to hold any weight and cracked or broke easily when folded or otherwise manipulated. The lack of whipping prior to cooking of the egg white may contribute to the chewy texture and low-strength of the regularly cooked egg whites using raw liquid egg whites. As shown by the data in Tables 1-6 above, protein-rich food products made in accordance with embodiments of the present disclosure are as strong or stronger, and as durable or more durable than cooked raw liquid egg whites. For instance, protein-rich food products made in accordance with embodiments of the present disclosure exhibited tear or tensile strengths of about 60 to about 760 grams of force, for more preferably about 100 to about 350 grams of force, and burst strengths of about 50 to about 450 grams of force, or more preferably about 100 to about 400 grams of force.

Physical Testing Methods

To determine a whip index of a whipped blend, smooth the top of the whip without flattening the whip, with a spatula or similar utensil. Then, insert a measuring rod into the mixture near or at the center of the mixing bowl so that the measuring rod reaches the bottom of the bowl. Then measure the whip's height with the measuring rod.

To determine whip density of a whipped blend, a container of known volume and weight is filled with the whipped blend. The container is then weighed and the container's weight is subtracted from the measured weight to obtain the weight of the whip. The weight of the whip is then divided by the known volume to obtain the whip's density.

To determine the percentage of solids in the whipped blend, testing pads are tared in an M2 microwave moisture/solids analyzer ("Moisture/Solids Analyzer") from Denver Instrument Co. A portion of the whipped blend is then placed between the testing pads, and the Moisture/Solids Analyzer is then engaged, which will determine the percent of solids in the whip.

To determine tensile or tear strength of a protein-rich food product, a 2 inch by 2 inch sample is cut from the desired protein-rich food product. Tensile strength testing is then performed on the 2 inch by 2 inch sample with a Texture Technologies Corp. TA.Xt Plus tester. The sample is held by a TA 96B miniature tensile grip fixture. A pre-programmed testing procedure stretches the sample to the break point. The test is performed three times to obtain an average value.

To determine burst strength of a protein-rich food product, a sample of the protein-rich food product is held by a large film extensibility rig mounted on the TA.Xt Plus tester. A pre-programmed testing procedure pushes a probe into the sample until it tears through it. The test is performed three times to obtain an average value.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the scope of the invention is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for."

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology.

What is claimed is:

1. A protein-rich food product comprising:
    water; and
    solids, wherein at least 70% by weight of the solids consist of protein, at least 60% of the protein being albumen,
    wherein the protein-rich food product has a moisture content of between 65% and 78% by weight, and
    wherein the protein-rich food product is substantially flat and comprises a matrix including burst membranes forming air escape paths, and has a thickness less than or equal to 3 millimeters, a tensile strength between 60 and 760 grams, and a burst strength between 50 and 450 grams, and wherein the tensile strength is an amount of force required to stretch the protein-rich food product to a break point and the burst strength is an amount of force required to tear through the protein-rich food product.

2. The protein-rich food product of claim 1, wherein the at least 70% of the solids consisting of protein consist of albumen or consist of albumen and a protein selected from the group consisting of whey, soy, and hemp.

3. The protein-rich food product of claim 2, wherein at least 80% of the solids consist of protein, by weight of the solids.

4. The protein-rich food product of claim 1, wherein the at least 70% of the solids consist substantially of albumen.

5. The protein-rich food product of claim 2, wherein the at least 70% of the solids are comprised of at least 60%, by weight of the solids, of the albumen and between 14.3% and 40%, by weight of the solids, of the protein selected from the group consisting of whey, soy, and hemp.

6. The protein-rich food product of claim 1, further comprising at least one additive selected from the group consisting of a sweetener, a seed, a nut, a spice, a cheese, a binder, a yolk, an oil, a vegetable, a flour, a fruit, a meat, a fiber, and a yeast.

7. The protein-rich food product of claim 1, wherein the protein consists substantially of albumen.

8. The protein-rich food product of claim 1, wherein the tensile strength is between 100-350 grams and the burst strength is between 100-400 grams.

9. The protein-rich food product of claim 1, wherein the matrix includes a fiberlike structure created by the burst membranes and a plurality of membranes formed between a plurality of intact bubbles.

10. The protein-rich food product of claim 1, wherein the tensile strength and the burst strength are measured in an unfrozen state after a cooling period.

11. The protein-rich food product of claim 1, wherein the protein-rich food product is a tortilla.

* * * * *